F. WARREN.
ELECTRIC WELDING MACHINE.
APPLICATION FILED AUG. 11, 1911.

1,046,240.

Patented Dec. 3, 1912.
2 SHEETS—SHEET 1.

WITNESSES
C. E. Walker.
E. E. Thomas.

INVENTOR
Frank Warren,
By Owen & Owen,
His attys.

F. WARREN.
ELECTRIC WELDING MACHINE.
APPLICATION FILED AUG. 11, 1911.
1,046,240.
Patented Dec. 3, 1912.
2 SHEETS—SHEET 2.
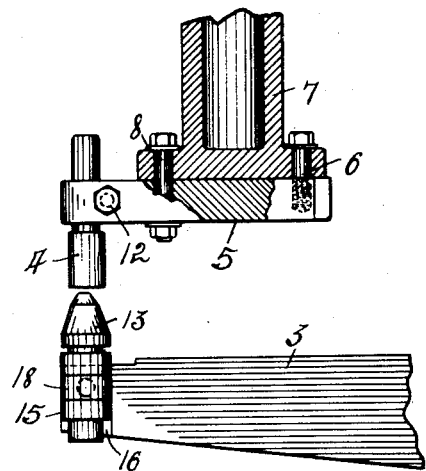
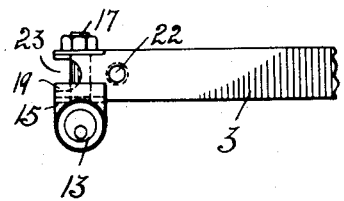
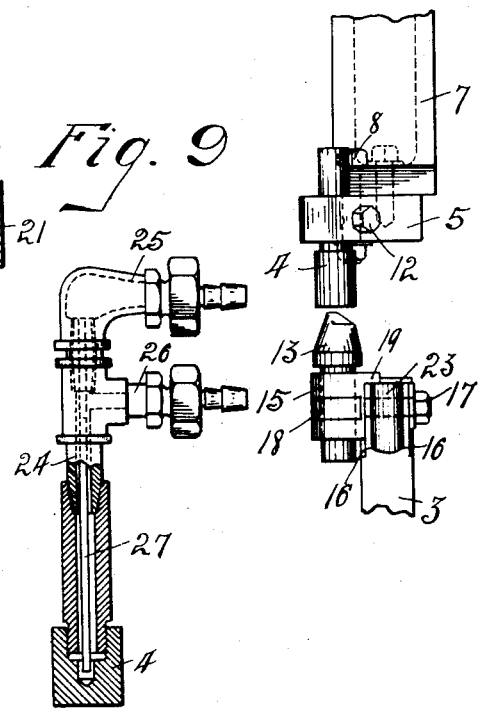
WITNESSES
C. E. Walker
E. E. Thomas
INVENTOR.
Frank Warren.
By Owen & Owen.
His attys.

UNITED STATES PATENT OFFICE.

FRANK WARREN, OF CINCINNATI, OHIO, ASSIGNOR TO THE TOLEDO ELECTRIC WELDER COMPANY, OF CINCINNATI, OHIO, A CORPORATION OF OHIO.

ELECTRIC WELDING-MACHINE.

1,046,240.  Specification of Letters Patent.  Patented Dec. 3, 1912.

Application filed August 11, 1911.  Serial No. 643,485.

REISSUED

*To all whom it may concern:*

Be it known that I, FRANK WARREN, a citizen of the United States, and a resident of Cincinnati, in the county of Hamilton and State of Ohio, have invented a certain new and useful Electric Welding-Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to electric welding machines, and has for its object the provision of a machine of this character, which is more particularly adapted for stove-welding, but may be used in other connections, as the welding of boxes or the like, and for such purposes is provided with one or more welding dies, which are capable of being placed in various positions relative to the frame horn or horns carrying the same to facilitate the welding of points within an article which could not otherwise be conveniently reached.

A further object of my invention is the provision, in a machine of this character, of a plurality of dies in water circulating series with the opposing die of the set, whereby to simplify the cooling-water circulating system, and to render possible an easy and rapid interchanging of the plural dies as the nature of the work being operated on or the conditions of use may require.

The invention is fully described in the following specification, and while, in its broader aspect, it is capable of embodiment in numerous forms, a preferred embodiment thereof is illustrated in the accompanying drawings, in which,—

Figure 1:
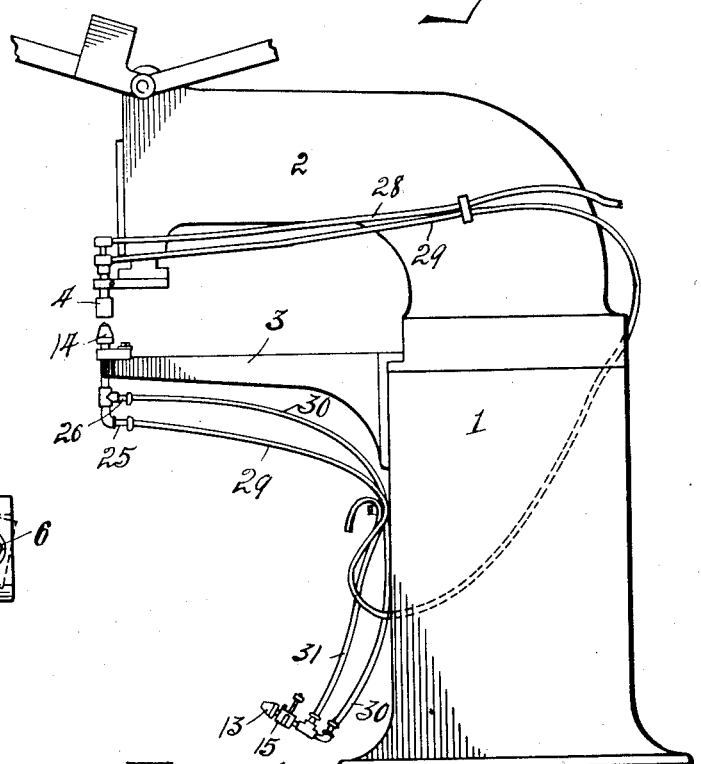
Figure 2:
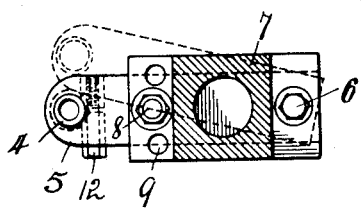
Figure 3:
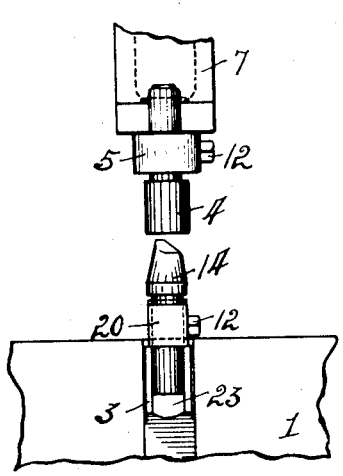
Figure 4:
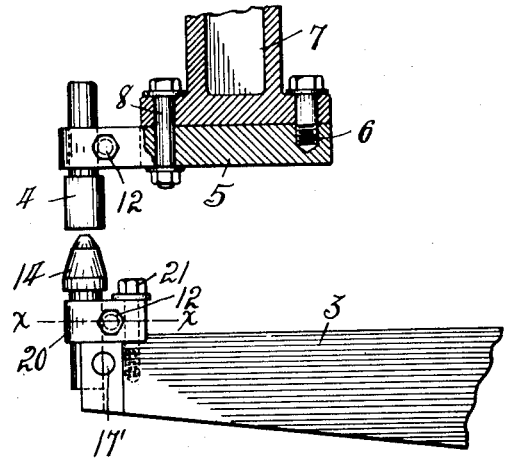

Figure 1 is a side elevation of a welding machine embodying my invention. Fig. 2 is an enlarged cross-section of the plunger looking down upon the attached die and its carrying arm. Figs. 3 and 4 are enlarged front and side details of the upper and lower dies of the machine and their carrying parts, with the central lower die of the set in position. Fig. 5 is an enlarged plan of a portion of the lower die-carrying horn with a side die of the set in position thereon. Fig. 6 is side view thereof in association with the upper die and its carrying parts. Fig. 7 is a front view of the latter figure, with the lower die in reverse position and the upper die set in proper position therefor. Fig. 8 is an enlarged section on the dotted line $x, x$ in Fig. 4, and Fig. 9 is an enlarged elevation of one of the dies and its associated circulating parts in partial central vertical section.

Referring to the drawings, 1 designates the machine frame having the upper and lower horns 2 and 3 with which the respective welding dies of the set are associated.

In carrying out the features of my present invention I provide a single upper die 4, the shank of which is shown in the present instance as being projected through and secured in a suitable manner within a vertical opening in the outer or free end portion of an arm 5, which is pivoted at its inner end, as at 6, to the lower end of a plunger 7 to enable it to be swung upon such pivot for the purpose of adjustment to suit the position of the upper die to that of the lower. The arm 5 may be secured in any one of its several positions of adjustment by a bolt or pin 8 projecting through the proper one of a set of holes 9 in the lower flanged end of the plunger and a hole in the arm, as indicated.

A simple means of securing the die shank within the arm aperture consists in inserting a pair of bushings 10 within an opening 11 provided transversely of the arm 5 in position to intersect a portion of the die-shank receiving opening, as shown in a similar connection in Fig. 8, and then inserting a stud-screw 12 through one and threading it into the other of the bushings 10 so that the head and threads of the screw coöperate to draw the bushings together in binding contact with the die-shank. I wish it understood, however, that my invention is not restricted to the methods described for adjustably attaching the die 4 to the plunger and securing the die to the arm 5.

The lower horn 3 is adapted for the securing of a lower die 13 to either side thereof or the securing of a die 14 centrally to the end thereof as indicated in different figures of the drawings. The side die 13 is shown in the present instance as having its shank fitting through an opening in a carrying block 15 which is adapted to be held to its seat 16 at either side of the end portion of the horn by a bolt 17 which projects through the block and a registering opening 17' in the horn. The bolt 17 also serves in the present instance as a means for binding the shank of the die within the block opening and for such purpose has its head portion 18 fitting into a recess in the outer side of the block and provided with an opening through which the die shank projects. The head of the bolt is adapted to work a sufficient distance within the block recess to permit its opening to be moved inwardly beyond register with the opening in the block, whereby a tightening of the bolt will cause the head and block to coöperate to firmly grip the die shank, see Fig. 7. It is obvious that the block 15 can be easily and quickly secured to or removed from either side of the horn as the nature of the work to be welded may require. The upper end of the block 15 is inwardly flanged, as at 19, to adapt it to project over the edge of the horn to assist in supporting the block.

The central die 14 is shown as having its shank projecting through an opening in the outer end portion of a carrying-block 20, which is secured to the upper outer end portion of the horn 3, by a screw 21 working through an opening in the inner end portion thereof and threading into an opening 22 in the horn. The shank of this die is shown as being secured within the block 20 by means of a set of bushings 10 and a cooperating screw 12, as above described, but may be secured therein in any other suitable manner. The die 14 has the lower end portion of its shank projecting below the block 20 and seating within a registering recess 23 in the end of the horn 3 to coöperate with such recess to prevent a swinging of the block 20 from central position.

In the welding of boxes, stove parts or the like, it is found convenient, if not necessary, to make the dies adjustable to render the same easily accessible to the interior of an article at different sides thereof or to its corners, and this may be easily accomplished with my invention by placing the die 13 at either side of the horn, or by using the central die 14, as the nature of the work or the condition of use requires. It is also preferable to offset the welding points of the lower dies from their axes to permit of a greater range of adjustment of the dies by a turning of the same within their respective carrying blocks and to permit a weld to be made close to a hole or side of the article.

For the purpose of connecting the several dies of a set in series in a water circulating system I make each die and its shank hollow to adjacent to the point of the die, as shown in Fig. 9, and tap a circulating pipe 24 into the outer end of the shank of each die. This pipe has nipples 25 and 26 projecting in spaced relation therefrom with the interior of the nipple 25 communicating with the interior of the die adjacent to the point thereof through a small tube 27, while the nipple 26 has communication with the interior of the die adjacent to its point through the space around the tube 27. To connect the different dies in series with a common source of water supply, an inlet tube 28 leads to the nipple 25 of one die, say the die 4, the circulation being thence through the associated tube 27 to the point of the die, and thence outwardly therefrom through the passage around the tube 27 and the nipple 25 of for instance the die 14, and thence through said die in the manner above described and outwardly therefrom through the tube 30 to the inlet nipple of the die 13, from whence it passes through said die and outwardly therefrom through the outlet tube 31. When one of the lower dies 13—14 is in use the other is disconnected from the horn 3 and hangs loosely from the machine without disconnecting it from the water circulating system as indicated in Fig. 1.

I wish it understood that my invention is not limited to any specific construction or arrangement of the parts except in so far as such limitations are specified in the claims.

Having thus described my invention, what I claim as new, and desire to secure by Letters Patent, is,—

1. An electric welding machine having an adjustable die, and removable capable of being mounted in different positions in opposition to the adjustable die.

2. An electric welding machine having an adjustable die, and a member capable of having a die attached thereto in different positions to suit the position of adjustment of said adjustable die.

3. An electric welding machine having an adjustable die, a die carrying member having a plurality of die seats thereon, and removable capable of being attached in different positions to said member to suit the position of adjustment of said first die.

4. In an electric welding machine, a horn, a block capable of being attached to either side of said horn and having a vertical opening therethrough and a flange at its inner upper edge for overlapping the upper edge of the horn, means for securing said block to either side of the horn, and a die having its shank secured within said block opening.

5. In an electric welding machine, a horn, a block capable of being secured to a side of said horn and having a vertical opening therethrough, a die having its shank projecting within said opening, and means serving both to clamp the block to the horn and to secure the die shank to the block.

6. In an electric welding machine, a horn having a recess in its outer end, a block secured to the upper outer end portion of said horn and having a vertical opening therethrough in register with said recess, a die having its shank projected through said opening and into said recess, and means for securing the die shank in such position.

7. In an electric welding machine, the combination of a die holding block having two openings therethrough which partially intersect each other, a die mounted in one of said openings, a bushing mounted in each end portion of the other opening, and means coöperating with said bushings to draw the same together in binding contact with the die shank to secure the same to the block.

8. In an electric welding machine, the combination of a die carrying member having two openings in right angled planes therethrough which partially intersect each other, a die shank mounted in one of said openings, a bushing disposed in the other opening at each side of the die shank and a screw projected through one bushing and threaded into the other bushing whereby its head and threaded end coöperate to draw the bushings together to grip the die shank.

9. In an electric welding machine, a set of at least three dies, a portion of which are removable, said dies having water circulating passages therein, and means connecting said die passages in series with a source of water supply.

10. In an electric welding machine, an upper movable die, and a plurality of removable lower dies, said dies being hollow, and means for connecting said dies in series with a source of water supply.

11. An electric welding machine having a plurality of dies provided with interior chambers connected in series with a source of cooling fluid supply.

12. An electric welding machine having a die, and a plurality of removable dies for opposing said first die and provided with interior chambers connected with a source of cooling fluid supply.

13. An electric welding machine having a die, and a plurality of removable dies for opposing said first die and provided with interior chambers connected in series with a source of cooling fluid supply.

In testimony whereof, I have hereunto signed my name to this specification in the presence of two subscribing witnesses.

FRANK WARREN.

Witnesses:
 ALMA LAMMERDING,
 E. V. FLEMING.

Copies of this patent may be obtained for five cents each, by addressing the "Commissioner of Patents, Washington, D. C."